(No Model.)
A. SÖDERSTRÖM.
TWIST DRILL.
No. 321,144. Patented June 30, 1885.
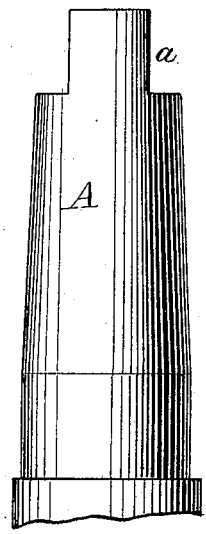
Fig. 1.
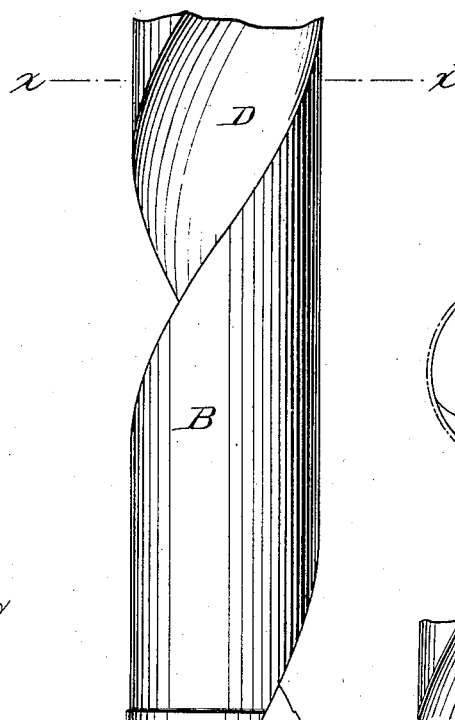
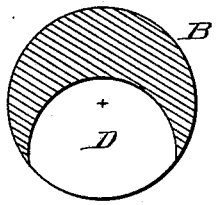
Fig. 2.
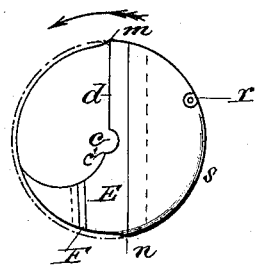
Fig. 3.
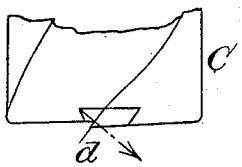
Fig. 5.
Fig. 4.
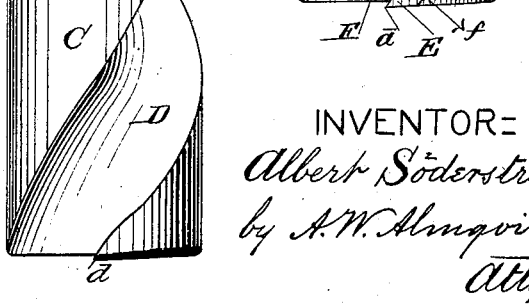
WITNESSES:
W H DeVoe
Robt W Matthews.
INVENTOR:
Albert Söderström,
by A. W. Almqvist
Atty.

UNITED STATES PATENT OFFICE.

ALBERT SÖDERSTRÖM, OF STOCKHOLM, SWEDEN.

TWIST-DRILL.

SPECIFICATION forming part of Letters Patent No. 321,144, dated June 30, 1885.

Application filed April 4, 1884. (No model.)

*To all whom it may concern:*

Be it known that I, ALBERT SÖDERSTRÖM, a citizen of Sweden, and a resident of the city of Stockholm, in the Kingdom of Sweden, have invented a new and useful Improvement in Twist-Drills, of which the following is a specification.

My invention relates to metal-boring drills for use more especially in boring deep holes of medium or large caliber, such drills having preferably a lubricating pipe or conduit leading to the cutting end, as shown in United States Patent No. 288,957, granted to me November 22, 1883.

The invention consists in the construction whereby ample space is gained for the chip to pass from the cutting edge up through the hole bored without clogging or impeding the rotation of the drill; also in the construction of the cutting end and the removable bit, and the construction whereby the removal of the drill from the bore is facilitated, as will be hereinafter described and claimed.

In the accompanying drawings, Figure 1 represents a side view of my improved metal-boring drill. Fig. 2 is a cross-section of the same taken on the line $x\,x$ of Fig. 1. Fig. 3 is a plan view of the cutting end of the drill. Fig. 4 is a detail side view of the cutting end, showing the construction of the removable bit and the manner of fastening the same. Fig. 5 is a similar view illustrating by comparison the advantage of the construction of the bit shown in Fig. 4.

A is the conical head by which the drill is kept in the drill-chuck, and is provided with flattened surfaces $a$ at its upper end to prevent its turning in the chuck.

B is the drill-shank.

C is the cutting-head, and D the spiral groove by which the chips pass out from the hole in the boring.

As shown in the drawings, the drill is provided with only one spiral groove, in the manner of ordinary, so-called "center-drills," having gimlet-point and one edge for boring in wood; but, unlike such drills, and unlike also the ordinary metal-boring drills with conical points and two cutting-edges and two spiral grooves, the depth of the groove in the present drill reaches beyond the center at the cutting-point and thence upward, as clearly shown in cross-section in Fig. 2, thus allowing for the chip (the width of which is of course equal to the radius) ample space to be carried in and pass upward while the drill revolves, the depth of the groove being, as shown, considerably greater than the length of the radius.

The point of the drill is flat, with only enough inclination for the cutting-edge $d$ to give it the pitch necessary for advancing inward. The shank B is of slightly smaller diameter than the cutting-head C, in order to prevent contact and consequent friction between the said shank and the wall of the bore; but in order to facilitate the removal of the drill from the bore the metal of the cutting-head is cut away on the side where the least resistance is from the outer extreme point of the cutting-edge at $m$, Fig. 3, to a point, $n$, a little beyond the diametrically-opposite point, so that the distance between the points $m\,n$ is slightly less than the diameter of the bore, allowing the drill to be moved laterally the radial distance between the outer circle, shown by dots and dashes in Fig. 3, and the inner circle, drawn in full line, and which shows the outline of the drill where the surface has been cut away, as aforesaid. When the drill is working and thus moved in the direction of the arrow in Fig. 3, the entire working-pressure is on the back of the drill, and the greatest pressure at about $s$, consequently the reducing of the opposite surface from $m$ to $n$ does not interfere with the correct working of the drill, there being no pressure on that surface. When the boring is stopped and the pressure of the cutting-edge ceases, it is evident that by the aforesaid reduction in diameter and consequent facility for sliding the drill laterally it at once becomes quite loose, no longer binding against the wall of the bore, and can thus be quickly and easily removed regardless of the depth of the bore. The oil-groove should be arranged to issue through the cutting end about where shown and indicated by the letter $r$ in Fig. 3. Unlike any other twist-drills, the small portion of the metal in the center is entirely cut away, as shown at $c$, leaving the cutting-edge $d$ clear and defined with sharp end points. The inner end point of the cutting-edge being thus at a little distance from the center, has sufficient motion to effect a clear cut, instead of dragging or grinding, as it does when the center is not thus cut away. It is evident that in consequence of this construction a central pin or core of metal will be uncut, and if not broken off would remain standing. In order, however, to obviate the necessity of breaking off the said central pin by hand the said circular cut $c$ is enlarged or cut away a little at $c'$, so that the aforesaid central pin will not have sufficient support on the side of the greatest resistance, and will therefore be gradually broken off in small pieces by the drill itself as the latter advances.

It is evident that a drill of this kind made entirely of steel and useless when the cutting-edge is worn out is expensive. I have therefore made the cutting-edge removable by forming it upon a bit, E, which is inserted, as seen in Figs. 3 and 4, in a groove with under-cut edges across the face of the cutting end, and in order to make it convenient to tighten the bit E easily in the very exact position required I fasten it by means of a key, F, inserted between it and the shortest under-cut edge of the aforesaid groove.

As during the working of the drill a very heavy pressure is exerted upon the tooth or bit in about the direction indicated by the arrow $f$ in Fig. 4, and it is therefore desirable to provide against the possibility of the edge being broken or forced out of the groove, I provide along the back or upper surface of the bit E a rib or ridge, $e$, fitting in a corresponding groove across the face of the head C, as clearly shown in Fig. 4, the pressure attending the twist being thus supported not only in the direction of the arrow $f$, but also (by the ridge and groove $e$) in the direction of the arrow $b$.

Having thus described my invention, I claim as new and desire to secure by Letters Patent—

1. A flat-pointed twist-drill having one spiral groove of depth reaching radially beyond the center at and above the cutting-point, substantially as and for the purpose set forth.

2. A twist-drill having one cutting-edge and spiral groove, and reduced in size on the side of the least resistance on a portion of its surface slightly exceeding the semi-circumference, as and for the purpose set forth.

3. In combination with a flat-pointed twist-drill grooved across the face of its cutting end, as explained, a bit or tooth, E, adapted to be secured in the said groove, and provided on its back or inner surface with a rib or ridge, $e$, fitting in a corresponding groove in the cutting end, substantially as and for the purpose set forth.

In testimony that I claim the foregoing as my invention I have signed my name, in presence of two witnesses, this 28th day of September, 1883.

ALBERT SÖDERSTRÖM.

Witnesses:
CARL EKERMANN,
FRANS AKERSTROM.